Aug. 4, 1936.          J. PAVELKA, JR          2,049,717
                       ELECTRIC TOASTER
                     Filed May 12, 1934          3 Sheets-Sheet 3
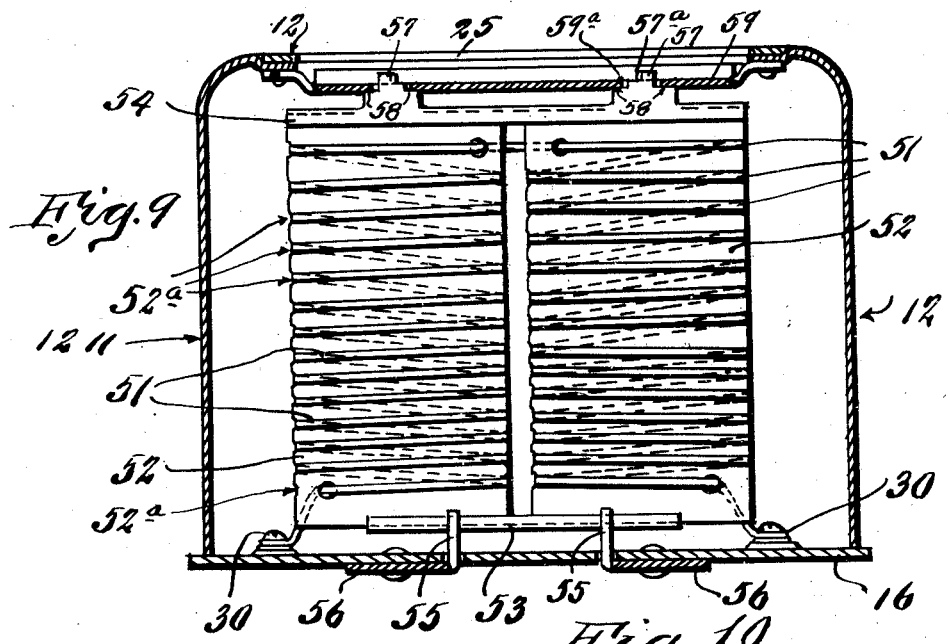
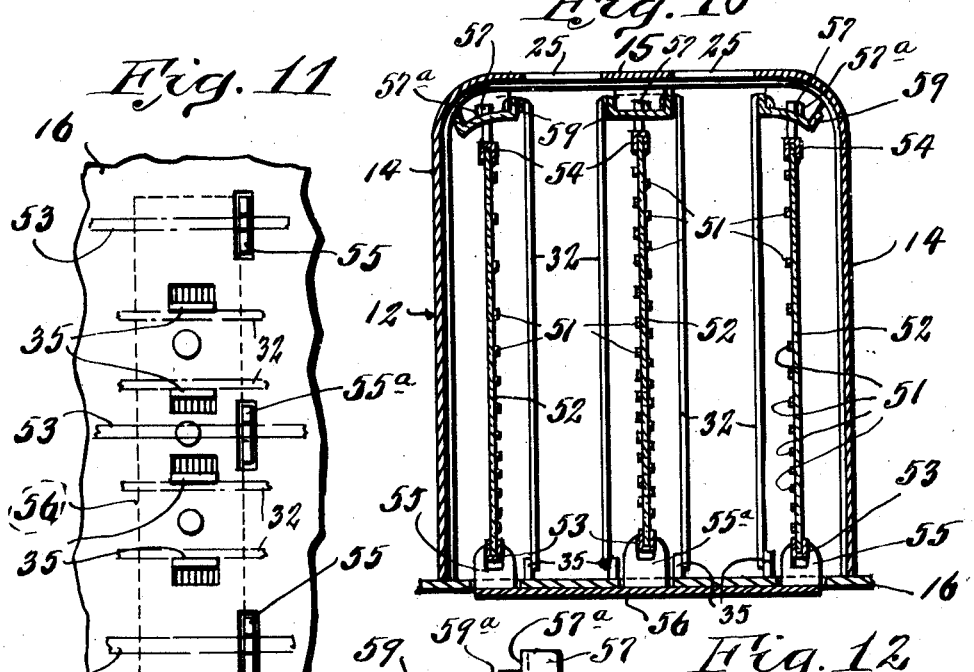
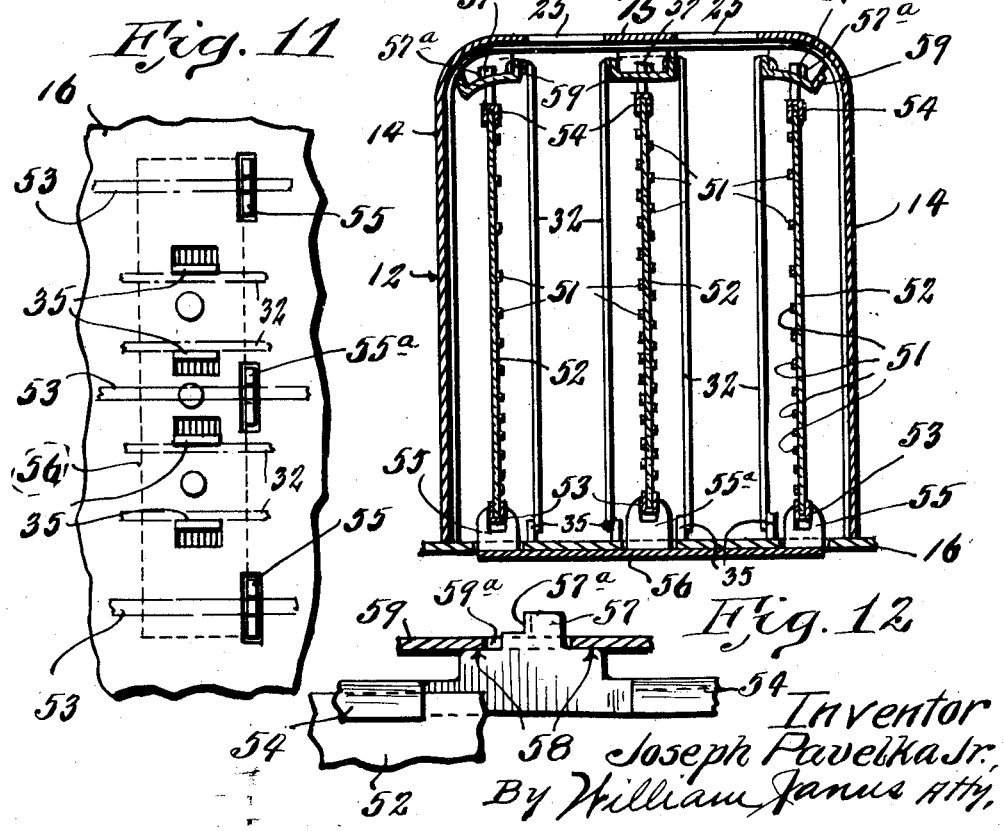
Inventor
Joseph Pavelka Jr.
By William Janus Atty.

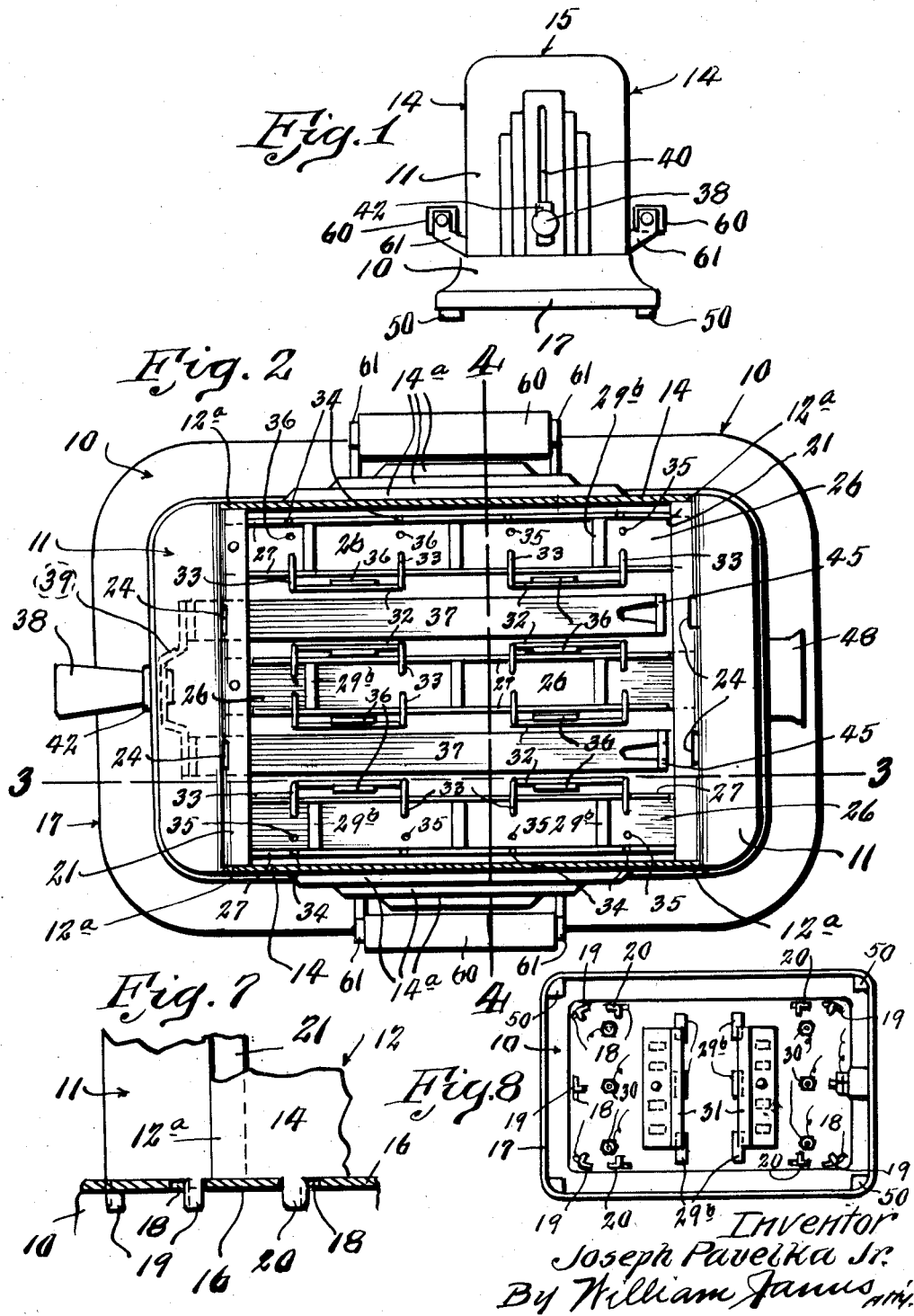
Aug. 4, 1936.     J. PAVELKA, JR     2,049,717
ELECTRIC TOASTER
Filed May 12, 1934     3 Sheets-Sheet 1

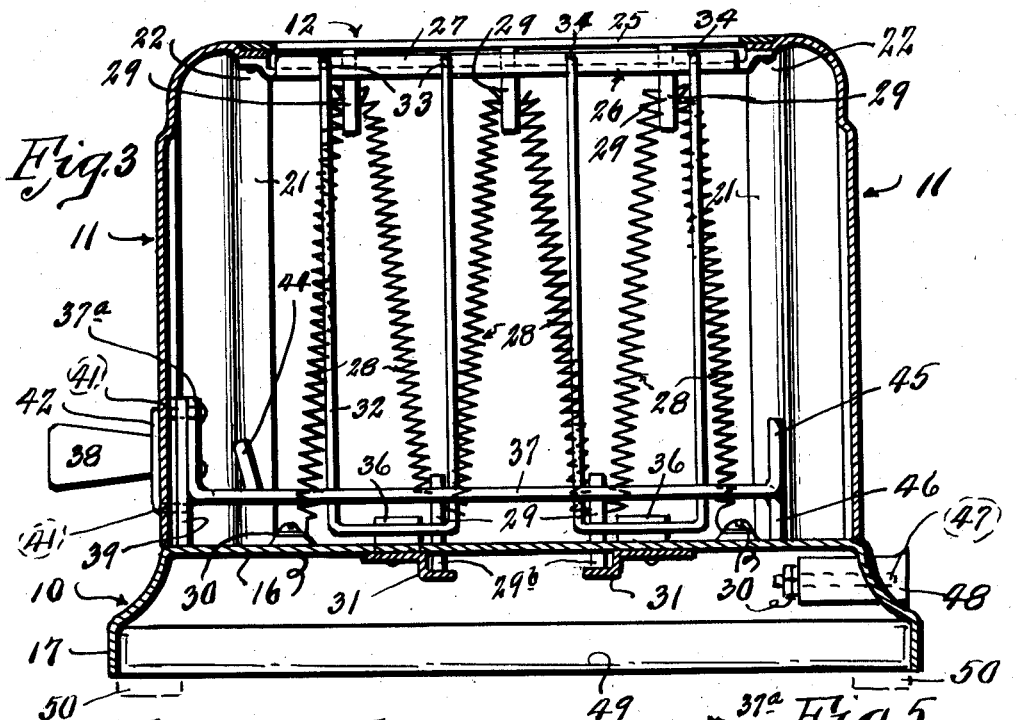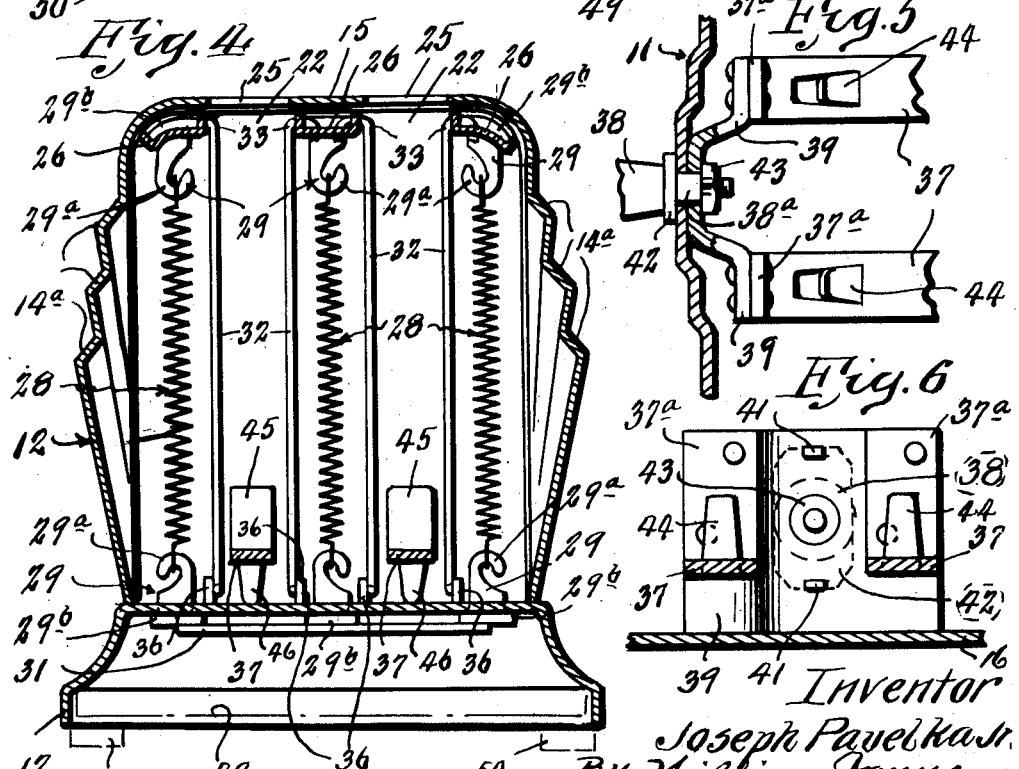

Patented Aug. 4, 1936

2,049,717

UNITED STATES PATENT OFFICE 2,049,717

ELECTRIC TOASTER

Joseph Pavelka, Jr., St. Louis, Mo., assignor to Joseph Pavelka, Richmond Heights, Mo.

Application May 12, 1934, Serial No. 725,237

18 Claims. (Cl. 219—19)

This invention relates to new and useful improvements in electric toasters.

One of the objects of the invention is the provision of a toaster which is of compact and neat appearance, is efficient in operation, and can be economically manufactured.

Other objects of the invention are to provide an electric toaster, the casing of which includes an inverted U-shaped member removably held in position intermediate the end walls of said casing so that a ready access can be had to the interior of the toaster for assembling and repair purposes.

Still other objects of the invention are to provide longitudinally disposed spaced-apart members extending between and secured to the upper ends of the end walls of the toaster casing and to connect the upper portions of the heating elements to the respective members and to provide a plurality of guide wires which are suspended from said longitudinal members and hold the slices of bread in spaced-apart relation with said heating elements.

Further objects of the invention are to provide a toaster which is so constructed that the rivets or other fastening devices used in assembling the toaster are so placed that they are not visible and, therefore, do not impair the appearance of the toaster.

With these and other objects in view, my invention consists in certain novel features of construction and arrangement of parts, hereinafter more fully described and claimed, and illustrated in the accompanying drawings, in which—

Figure 1 is an end elevational view of my improved toaster.

Figure 2 is an enlarged top plan view with the body portion partly in cross section.

Figure 3 is a vertical cross section taken on line 3—3 of Figure 2.

Figure 4 is a vertical cross section taken on line 4—4 of Figure 2.

Figure 5 is an enlarged horizontal detail cross section showing the means for mounting the bread slice carriers.

Figure 6 is a detail cross section taken on line 6—6 of Figure 5.

Figure 7 is an enlarged cross section showing means for securing the casing to the base.

Figure 8 is a reduced plan view looking against the underside of the base.

Figure 9 is a fragmental vertical cross section taken longitudinally through a modified form of a toaster.

Figure 10 is a fragmental vertical cross section taken transversely through the same.

Figure 11 is an enlarged fragmental plan view of the top wall of the base.

Figure 12 is an enlarged fragmental side elevation of the upper end of the modified heating element.

Referring by numerals to the accompanying drawings, 10 indicates the base of a toaster, 11 the end walls thereof, and 12 an inverted U-shaped member which forms the side walls 14 and top 15 of the toaster.

The base 10 has a flat upper wall 16 and downwardly presented marginal flanges 17. This top wall 16 is formed with a plurality of slots 18 suitably spaced to receive tongues 19 of the end walls 11 and tongues 20 of side walls 14. Tongues 19 are formed integral with the lower edge of each end wall and each tongue is undercut on one side so that a portion of said tongue can be distorted or bent to lock the tongue in said aperture and prevent the withdrawal of the end wall. Tongues 20 are formed integral with the lower ends of side walls 14 and are similarly undercut to lock the U-shaped member 12 in position on the base.

Each end wall 11 is formed along its top and sides with an inwardly projecting flange 21. These flanges form overlapping joints with the corresponding edges 12a of the inverted U-shaped member 12 and they are offset to provide shoulders so as to place said edges 12a in the same plane with the surfaces of said end walls and preserve a smooth joint. Each edge 12a is formed at its top portion with two integral extensions or tongues 22 bent downwardly to fit into slots 24 formed in the horizontally disposed portions of flanges 21.

The top wall 15 of member 12 is formed with two elongated openings 25 which are arranged in parallel spaced relationship with each other. These openings form ingress to the two toasting compartments permitting the insertion of slices of bread into the latter.

The upper ends of end walls 11 are connected together by three longitudinally disposed members 26, the ends of which are secured to the undersides of the flanges 21 of the respective end walls. One of said members 26 is arranged centrally between the openings 25 while the other two members are arranged each to one side of the respective opening. Members 26 are preferably channel-shape, the edges thereof being turned upwardly to form flanges 27 and the outer members are slightly curved in transverse cross section in order to conform to the curved corners of the end walls and of the curved corners of member 12.

The heating sections or elements are disposed in three groups below and in vertical planes with the respective members 26. Thus the outer sections are arranged adjacent to the respective side walls 14 and form the outer walls of the heating compartments, while the third section is disposed centrally between said heating compartment and below the central cross member 26.

In the form shown in Figures 2, 3, and 4, each heating section consists of a coiled resistance wire 28 arranged in zig-zag fashion, being attached at its upper portions to the respective members 26 at equidistant points and at its lower portions at two points while the ends of each section are anchored to the base 16 near each end wall 11.

The points of attachment of each heating element intermediate its ends consists each of a hook-shaped member 29 seated in members 26 and in the horizontal wall 16 of base 10. The ends of each heating element are secured in place by terminal screws 30. Each member 29 is formed of suitable insulation material and consists of a hooked portion 29a which projects inwardly through suitable apertures formed in member 26 and wall 16. Each member 29 is formed on its outer end with an enlargement 29b which is larger than the respective opening, thereby limiting the inward movement of member 29. When members 29 are in place, the top wall 15 of casing portion 12 prevents displacement or upward movement of members 29 contained in longitudinal members 26.

The hook members 29 placed in wall 16 of base 10 are held in place by two members 31 which are secured to the underside of wall 16 and extend transversely thereof and cover up the ends 29b of the respective hooks.

In order to guide the bread slices in the toasting compartments, a plurality of U-shaped guides 32 is arranged to each side of the compartment. The guides extend upwardly and the upper ends thereof are bent to form hooks 33 which engage notches 34 formed in the flanges 27 of members 26, while the downwardly presented ends of said hooks 33 enter apertures 35 formed in the web or horizontal portion of said members 26.

The horizontally disposed or bight portions of said guides are disposed near the wall 16 and are each engaged by a projection 36 which prevents the movement of the lower end of the guide toward the corresponding heating element. Preferably these projections are formed by striking upwardly from wall 16 suitable tongues. The openings thus formed in wall 16 are closed or sealed by members 21.

The bread slices are supported in their respective toasting compartments by carriers 37 which are vertically movable. In the present instances, there are two carriers and they operate in unison, being connected to a single handle 38. Each carrier 37 comprises a horizontally disposed bar extending longitudinally of the respective toasting compartment. One end of each carrier 37 is bent upwardly as indicated at 37a and is secured to a plate 39 disposed on the inner side of one of the end walls 11. This wall is formed with a vertically disposed slot 40 and extending therethrough are two spaced-apart fingers 41 which are formed integral with a slidable plate 42. This plate is arranged against the outer side of said end wall and is secured to plate 39 by the shank 38a of handle 38. Fingers 41 engage suitable apertures formed in plate 39 at points spaced above and below shank 38a and serve to hold carriers 37 in properly aligned positions. Preferably the shank 38 is detachably secured to plate 39 by a nut 43.

A finger or projection 44 is struck up from each carrier 37 adjacent to the end 37a thereof, while the opposite end of each carrier is turned upwardly as indicated at 35. These portions 44 and 45 hold the slice of bread against movement longitudinally of the carrier so that said slice remains in proper alignment with the openings 25 of the respective toasting compartments.

A tongue 46 is struck down from each carrier 37 adjacent to end 45 thereof and forms a foot or support for said end. Thus each carrier 37 when in lowered position is supported by tongue 46 at one end and by plate 39 at the other. A pair of connector pins 47 is arranged in one end of base 10 by means of an open-ended pocket or shield 48 so that said pins are protected and only a flexible cord equipped with the usual plug can be used to connect the toaster with the supply lines. The base 10 is closed by a removable plate 49 shown in dot-and-dash lines in Figures 3 and 4. This plate has an upward marginal flange which fits within and is frictionally held in position within the downwardly presented flange 17 of said base. Feet 50, preferably of heat non-conducting material, are secured to flange 17 and space the base 10 from the surface on which the surface is supported and also prevents scratching of said surface.

The heating elements 28 are suitably connected with the connector pins 47 so as to complete the circuit therewith. Preferably a suitable timing mechanism and a switch operable thereby are arranged in base 10 and interposed in the circuit of the heating elements. This timing mechanism and switch is not shown in the instant case as any suitable timing device can be used for the purpose. One type of such device is disclosed in United States Patent No. 1,914,224.

The side walls 14 of a U-shaped casing member 12 are preferably ornamented by a suitable design stamped therein. As shown in the drawings, each design includes angularly disposed wall portions 14a which are pressed outwardly and serve to reflect the heat rays downwardly within the toasting compartment.

In the form shown in Figures 2, 3, and 4 the heating elements are in the form of a coiled resistance wire supported at spaced points by insulation hooks 29.

In the form shown in Figures 9, 10, and 11 the heating element is in the form of a ribbon 31 wound on a sheet of mica or other flat insulation core 52. These mica sheets are removably supported within the toaster so as to form the respective toasting compartments. Preferably each mica sheet consists of two sections arranged vertically adjacent to each other and with their inner edges spaced from each other. The vertical edges of each section are notched as indicated at 52a and are held in fixed relationship with each other by a bottom piece 53 and a top piece 54. These pieces are U-shaped in cross section and are secured to the bottom and top edges of said sections by crimping or indenting the sides of each piece.

The bottom piece 53 terminates short of the ends or other vertical edges of the mica member in order to provide sufficient clearance between the terminals of the resistance material 51 and side piece 53. This bottom piece is held in position on the horizontal wall 16 of base 10 by ears 55 which are formed integral with a member 56. This piece is secured to the underside of wall 16 and the ears 55 extend upwardly into the toasting compartments through elongated openings formed in said wall for that purpose and are provided with upwardly presented notches to receive bottom piece 53. These pieces 56 extend transversely of the toaster and take the place of pieces 31 in closing the openings formed by stamping out projections 35.

The upper pieces 54 are each provided with a pair of upwardly presented projections 57 each having shoulders 58. The cross members 59 which extend between and are secured to the upper ends of end walls 11 are provided each with a pair of longitudinally disposed spaced-apart slots 59a for receiving the shouldered projections 57.

As the slots 59a in the center cross member 59 are slightly higher than the slots in the two outer cross members due to the fact that the latter are disposed on a curve, the center ear 55a of each member 56 is of greater height and the notch formed therein is higher than the notches formed in the outer ears.

The central heating section or mica sheet 52 forms a partition wall for the two toasting compartments and therefore has its heating member 51 wound on both sides. In the case of the two outer sections, the heating member 51 is so wound that it is disposed on the inner side only with the exception of short lengths where the looped ends are caught in the notches 52a on the edges of said mica section. This arrangement eliminates sagging of the heating elements and in the case of the two outer sections locates the heat on the inner or compartment sides only. Thus not only is the heat concentrated in the toasting compartments but the casing, and especially sides 14 thereof, are protected from heat and kept comparatively cool.

The heating sections or elements can be easily inserted in or removed from position in the toaster. The top and bottom pieces 53 and 54, respectively, not only reinforce the mica core 52 but also provide in conjunction with the bottom member 56 and top members 59 simple and efficient means for detachably mounting the heating elements in place in the toaster without the use of extraneous attaching devices.

To place a heating element in position, all that is necessary is to flex or curve the same so as to reduce the distance between the top and bottom edges thereof, whereupon the bottom pieces 53 can be placed in the notches of the corresponding ears 55 and the projections 57 of the top piece 54 inserted in the slots 59a of the corresponding cross member 59. When the heating element is released, it assumes its regular shape with the top and bottom thereof securely held in position. The ends of the resistance ribbon 51 are secured in position by binding screws 30.

As the guides 52 are also removable by lifting the upper hooked ends 33 thereof from their respective members 59, any or all of said heating elements can be removed from the toaster. As stated before, the casing members 11 and 12 are attached at their bottom edges to base 10 by tongues 19 and 20, respectively, which enter apertures formed in the wall 16 of said base. The only rivets used serve to secure the ends of members 26 or 59 to the offset edges 21 of end walls 11. As these edges are covered by the edges 12a of member 12, said rivets are not visible and thus the toaster has no rivets or other securing devices disposed on its exterior and presents a neat smooth appearance. Preferably, handles 60 are attached to the walls 14 of casing member 12 by brackets 61.

In the form shown in Figures 9 to 12, inclusive, the heating elements are suspended from cross members 59. The notches in ears 55 are sufficiently deep to provide clearance between the bottom pieces 53 and the bottoms of said notches. As each heating element is supported at its upper end only, it is free to expand in all directions and, therefore, there is no danger of buckling or warping thereof.

The ears or projections 55 engage the opposite sides of the lower end of the heating element and serve to hold the latter against lateral movement.

Projections 57 of each heating element are undercut or horizontally notched on their opposite sides and when the heating element is in place the undercut portions 57a of each projection 57 is bent laterally out of the vertical plane of slot 59a. Thus the laterally bent portions 57a support the heating element in position on each cross member 59.

To remove the heating elements, the bent portions 57a are straightened so as to permit the removal of projections 57 from slots 59a.

Thus the heating elements can be readily placed in position and removed, and access to the heating elements is provided by the removable feature of the inverted U-shaped member 14 which is held in place by the engagement of its lower ends with the wall 16 of base 10 and is secured in position without the use of screws or other fastening devices.

While I have shown and described herein the preferred form of my improved toaster, it is understood that various changes in the construction and arrangement of parts can be made and substituted for those herein shown without departing from the spirit of my invention.

I claim:

1. In an electric toaster, the combination of a base, a pair of end walls secured thereto, a plurality of cross members connecting the upper ends of said end walls, an inverted U-shaped member disposed between said end walls and forming top and side walls for said toaster, said top being provided with an elongated opening forming ingress to the interior of said toaster, said cross members being disposed to each side of said opening, heating elements arranged in said toaster to each side of said opening and extending between and secured to said base and the respective cross members, and a bread slice carrier mounted in said toaster for movement in a vertical plane with said opening and in spaced-apart relationship with said heating elements.

2. In an electric toaster, the combination of a base, a pair of end walls secured thereto, a plurality of longitudinally and horizontally disposed members connecting the upper ends of said end walls, an inverted U-shaped member disposed between said end walls and forming top and side walls for said toaster, said top being provided with an elongated opening forming ingress to the interior of said toaster, said longitudinal members being disposed to each side of said opening, heating elements arranged in said toaster to each side of said opening, means for securing said heating elements to said base and the corresponding longitudinal member, a bread slice carrier movably disposed in said toaster, and means for guiding said carrier and holding it in spaced-apart relationship with said heating elements.

3. In an electric toaster, the combination of a base, a pair of end walls secured thereto, a plurality of cross members extending longitudinally between and connected to the upper ends of said end walls, an inverted U-shaped member disposed between said end walls and forming top and side walls for said toaster, said top being provided with an elongated opening forming ingress to the interior of said toaster, said cross members being disposed to each side of said opening, heating elements arranged in said toaster to each side of said opening, means for securing said heating elements to said base and to the respective cross members, a bread slice carrier disposed in said toaster for movement in a vertical plane with said toaster opening, an extension on said carrier projecting outwardly from said toaster through a vertical slot formed in one of the end walls thereof for manually operating said carrier, and guide means in said toaster for holding the bread in spaced-apart relationship with said heating elements and for guiding said carrier in its movements.

4. In an electric toaster, the combination of a base, a pair of end walls fixed thereto, a plurality of cross members extending longitudinally between and secured to the upper ends of said end walls, an inverted U-shaped member extending between said end walls and enclosing said cross members and forming top and side walls for the toaster, said top being provided with a pair of spaced juxtaposed elongated openings forming ingress to said toaster, said cross members being disposed to each side of each opening, a heating element arranged in said toaster to one side of each opening and intermediate said openings, thereby forming a pair of toasting compartments, each of which is arranged in vertical plane with the respective ingress opening in said top, means for detachably anchoring each heating element to said base and to the corresponding cross member, and a bread slice carrier mounted in each toasting compartment and movable in a vertical plane with the opening thereof.

5. In an electric toaster, the combination of a base, a pair of end walls having their lower ends secured thereto, a plurality of cross members longitudinally disposed between and secured to the upper ends of said end walls, an inverted U-shaped member having its side edges in overlapping engagement with the edges of said end walls and having its ends secured to said base, a plurality of heating elements arranged in spaced-apart relationship in said toaster, means in said base for engaging the lower ends of said heating elements, and means for interengaging the upper ends of said heating elements with the corresponding cross members.

6. In a toaster, the combination of a base having a horizontally disposed wall forming the bottom of said toaster, a pair of end walls, means for detachably securing the lower ends of said end walls to said horizontal wall of said base, an inverted U-shaped member having its edges in overlapping engagement with the opposed edges of said end walls and forming top and side walls of said toaster, means for securing the lower ends of said inverted U-shaped member to said bottom wall, a plurality of heating elements in said toaster, and means for supporting said heating elements in spaced-apart relationship in said toaster.

7. In a toaster, the combination of a base having a horizontal wall forming the bottom of the toaster casing, said wall being provided with a plurality of spaced-apart openings, a pair of casing end walls, tongues formed integral with the lower ends of said end walls for engaging the respective openings of said bottom wall and securing said end walls on said base in spaced-apart relation, an inverted U-shaped member forming top and side walls of said toaster casing and having its edges in engagement with the opposed edges of said end walls, tongues formed integral with the lower ends of said U-shaped member and engaging the respective openings in said bottom wall for securing said U-shaped member in position, a plurality of heating elements arranged in spaced-apart relationship in said toaster casing, and means for supporting the bread slices between said heating elements.

8. In a toaster, the combination of a base having a horizontal wall forming the bottom for the toaster casing, said wall being provided with a plurality of spaced-apart openings, a pair of casing end walls, projections on the lower ends of said end walls for engaging the respective openings in said bottom wall and detachably supporting said end walls on said base in spaced-apart relationship, an inverted U-shaped member forming top and side walls of said toaster casing and having its edges in overlapping engagement with the opposed edges of said end walls, projections formed on the lower ends of said U-shaped member for engaging the respective openings in said bottom wall and removably securing said U-shaped member in position, a plurality of heating elements, means for removably supporting said heating elements in said toaster casing in spaced-apart relationship with each other, and a bread slice carrier movably mounted in said casing between said heating elements.

9. In a toaster, the combination of a toaster casing including end walls, side walls, and a bottom wall; a plurality of heating elements each comprising a sheet of insulation material and a resistance wire wound thereon, a plurality of lugs projecting upwardly from said bottom wall, each lug being provided with an upwardly presented notch to receive and hold the bottom edge of the corresponding insulation sheet, the bottom of each notch being spaced below the bottom edge of the corresponding sheet, and means for detachably engaging the upper edge of each insulation sheet and suspending said heating elements in spaced-apart relationship in said casing.

10. In an electric toaster, the combination of a toaster casing including end walls, side walls, a bottom wall, and a plurality of top cross pieces connected to the upper ends of said end walls; a plurality of heating elements each comprising a sheet of insulation material and a resistance wire arranged thereon, a plurality of lugs extending upwardly from said bottom wall, each being provided with an upwardly presented notch to receive the bottom edge of the heating element, and a projection extending upwardly from the upper edge of each insulation sheet and engaging an opening formed in the corresponding cross piece, the distance between the tops of said lugs and said cross members being less than the distance between the bottom edge of said insulation sheet and the top edge of said upward projection whereby each heating element has to be flexed to permit engagement and disengagement thereof with said lugs and its respective cross piece.

11. In an electric toaster, a heating element comprising a sheet of insulation material, a resistance wire wound thereon, a reinforcing strip of metal U-shaped in cross section secured to the bottom edge of said insulation sheet, and a reinforcing strip of metal secured to the upper edge thereof, said last-mentioned strip being provided with integral undercut projections extending upwardly from said strip and adapted to be bent laterally of the vertical plane to support said heating element in a suspended position.

12. In an electric toaster, the combination with a toaster casing including a bottom wall therefor, and a plurality of longitudinally disposed cross pieces arranged near the top of said casing, each cross piece being formed with a plurality of spaced-apart openings; of a plurality of heating elements, a member secured to the upper end of each heating element and having a plurality of spaced-apart upward projections extending through said openings of the corresponding cross piece, each projection being bent laterally above said opening for suspending said heating element from said cross piece, and upward projections on said bottom wall for engaging only the sides of the bottom edge of said heating element and holding it against lateral movement but maintaining it free to expand downwardly.

13. In an electric toaster, the combination with a toaster casing including a bottom wall therefor, of a plurality of cross pieces fixed in the upper end of said casing and provided each with a pair of spaced-apart slots, a plurality of heating elements, a member fixed to the upper end of each heating element and provided with a pair of upward extensions adapted to project through the slots of the respective cross piece, said extensions being undercut on opposite sides to permit bending of said undercut portions laterally out of alignment with said slots and suspend said heating element from said cross piece, and upward projections on said bottom wall for engaging the sides of the lower end of each heating element and hold the latter against lateral movement.

14. In an electric toaster of the character described, a heating element comprising a sheet of insulation material, a resistance wire wound thereon, and a section of metallic member fixed longitudinally to the upper end of said insulation material, said metallic member having a pair of integral upward extensions adapted to be bent laterally out of the vertical plane of said heating element for suspending the latter in position.

15. In an electric toaster of the character described, a heating element comprising a sheet of insulation material, a resistance wire wound thereon, and a section of metallic member fixed longitudinally to the upper edge of said insulation material, said metallic member being provided with a pair of integral upward extensions, each of which is undercut on one side whereby the undercut portion of each extension can be bent laterally out of the vertical plane of said heating element and support the latter in suspended position.

16. In an electric toaster, the combination of a base, a pair of vertically disposed end walls arranged in spaced-apart relationship on said base and having their lower ends secured thereto, an inverted U-shaped member having its edges engaging said end walls and forming a top and sides of said toaster, means for detachably securing the lower end of said U-shaped member to said base, a plurality of heating elements, and means for detachably supporting said heating elements in spaced-apart relationship in said toaster.

17. In an electric toaster, the combination of a base, a pair of vertically disposed end walls having their lower ends fixed to said base, an inverted U-shaped member extending between said end walls to form top and sides of said toaster and having its lower ends fixed to said base, a plurality of heating elements, a plurality of longitudinal cross pieces fixed to and extending between the upper ends of said end walls, and means engaging said cross members and said base for supporting said heating elements in said toaster whereby said heating elements are mounted independently of said inverted U-shaped member and the latter can be detached without disturbing said heating elements.

18. In an electric toaster, the combination of a base, a pair of vertically disposed end walls having their lower ends fixed to said base, an inverted U-shaped member extending between said end walls to form top and sides of said toaster and having its lower ends detachably fixed to said base, the top of said U-shaped member being formed with an elongated opening, a heating element arranged within said toaster to each side of the vertical plane of said opening, means within said toaster for supporting said elements independently of said U-shaped member, and a bread carrier slidably mounted in said toaster between said heating elements for movement in a vertical plane with said opening.

JOSEPH PAVELKA, Jr.